(12) United States Patent
Kim et al.

(10) Patent No.: US 8,365,321 B2
(45) Date of Patent: Feb. 5, 2013

(54) METHOD OF PREPARING BATH TUB WITH CUSHION AND BATH TUB WITH CUSHION

(76) Inventors: Kyung-jun Kim, Seoul (KR); Jong-kwan Lee, Kimpo (KR)

(*) Notice: Subject to any disclaimer, the term of this patent is extended or adjusted under 35 U.S.C. 154(b) by 6 days.

(21) Appl. No.: 13/265,144

(22) PCT Filed: Apr. 21, 2010

(86) PCT No.: PCT/KR2010/002492
§ 371 (c)(1),
(2), (4) Date: Nov. 29, 2011

(87) PCT Pub. No.: WO2010/123271
PCT Pub. Date: Oct. 28, 2010

(65) Prior Publication Data
US 2012/0066830 A1    Mar. 22, 2012

(30) Foreign Application Priority Data
Apr. 22, 2009   (KR) .................. 10-2009-0034864

(51) Int. Cl.
*A47K 3/02* (2006.01)
(52) U.S. Cl. .......................................... 4/584
(58) Field of Classification Search .............. 4/538–595; 264/46.4
See application file for complete search history.

(56) References Cited

FOREIGN PATENT DOCUMENTS
KR          100832051 B1  *  5/2008
* cited by examiner

*Primary Examiner* — Lori Baker
(74) *Attorney, Agent, or Firm* — Lexyoume IP Meister, PLLC.

(57) ABSTRACT

A method of manufacturing a bathtub includes a first operation of forming an external structure layer forming an external appearance of the bathtub; a second operation of forming a mold-release agent layer having a bathtub forming surface corresponding to an internal shape of the bathtub and a flange extending from a circumference of the bathtub forming surface to the outside, on an external surface of an internal mold; and a third operation of forming a semi-rigid foam layer having a first unfoaming painted layer, a soft foam layer, and a second unfoaming painted layer in sequence such that the soft foam layer is sandwiched between the first unfoaming painted layer and the second unfoaming painted layer. The semi-rigid foam layer is formed between the external structure layer and the mold-release agent layer by being injected in a space between the external structure layer and the mold-release agent layer.

6 Claims, 2 Drawing Sheets

METHOD OF PREPARING BATH TUB WITH CUSHION AND BATH TUB WITH CUSHION

FIELD OF THE INVENTION

The present invention relates to a method of preparing bathtub with cushion and a bath tub with cushion, and more particularly, it provides a bathtub with cushion function having a good contact feeling with regard to the inside layer of the bathtub, giving comfort due to its cushion, securing safety from impact due to its elastic material, having such an excellent warmth keeping ability that water needs not to be refilled during bath, and being able to be used even as a bed or cradle after bath especially in case of being applied to bathtubs for infants, and further, it relates to a method of preparing bathtub, which enables to manufacture a cushioned bathtub with a low cost due to a simplified manufacturing process and thereby reduction of unnecessary production loss and manufacturing costs and the bathtub.

BACKGROUND OF THE INVENTION

1. Field of the Invention

The present invention relates to a bathtub with cushion and a preparation method thereof, and more particularly, to a bathtub with cushion and a preparation method thereof which provides good feeling of touch in an internal surface of the bathtub, feeling of comfort with cushion, secures safety with a cushion material with respect to shock, does not need to supplement water during bath by keeping water warm, provides a bathtub with cushion that can be used as a baby's bed or cradle after the bath if used as a baby's bathtub and greatly improves productivity of the bathtub with cushion by reducing forming time of a elastic protecting layer which causes production deterioration in related art.

2. Description of the Related Art

Generally, a bathtub is classified into a portable type and a fixed type. The former is mainly used for babies and prepared with hard plastic such as polyethylene or polypropylene ABS resin. That is, the method of preparing a conventional hard plastic bathtub includes a mold opening method and an injection mold by molding resin including polyethylene or polypropylene ABS resin added with a hardener. In case of a fixed bathtub, it is classified into an artificial marble bathtub prepared by molding unsaturated polyester resin and an acryl bathtub by vacuum-shaping an acryl layer.

The conventional method of preparing the bathtub enables to provide a low-cost, light tub, which, however, deteriorates a sense of touch, is not good for skin, does not keep water warm, causing a user to supplement water during bath. Such a problem becomes worse when infants or babies are given a bath. Moreover, the hard bathtub may cause safety accidents if a user collides with the bathtub or fall over the bathtub with great shock. To improve such a problem, a bathtub with elasticity or cushion has been developed.

In order to address the prior problems, there has been disclosed a cushioned bathtub prepared by the formation of an exterior layer of structure body, layer of foaming agent, layer of elastic protection, painting layer, and transparent coating layer in sequence and further, the inventors filed a patent application directed to a cushioned bathtub comprising forming an external structure layer, forming a mold-release agent layer on the outside surface of the inner mold, forming an inner layer of elastic body comprising a cushion surface coating layer and an elastic protection coating layer of fast cure on the top surface of the layer of release agent, forming an effervescent foam layer in the gap between the external structure layer and the inner layer of elastic body, and finishing its remaining rims. However, these methods require complicated manufacturing processes because each layer is formed in a separate process, and long manufacturing time, and has a high failure rate. Therefore, there is an urgent need on the development of a novel manufacturing method for lowering production loss and manufacturing costs.

SUMMARY OF THE INVENTION

In order to solve the problems of the prior arts and prepare a cushioned bathtub by simplified process, it is an object of the present invention to provide a bathtub with cushion function having a good contact feeling with regard to the inside layer of the bathtub when compared to the prior cushioned bathtubs, giving comfort due to its cushion, securing safety from impact due to its elastic material, having such an excellent warmth keeping ability that there is no need to refill water during bath, and being able to be utilized even as a bed or cradle after bath especially in case of being applied to bathtubs for infants, and further, to provide a method of preparing bathtub, which enables to manufacture a cushioned bathtub with a low cost due to a simplified manufacturing process and thereby reduction of unnecessary production loss and manufacturing costs and the bathtub.

In order to achieve the object mentioned above, there is provided in this invention a method of preparing bathtub comprising a first operation of forming an external structure layer forming an external appearance of a bathtub; a second operation of forming a mold-release agent layer having a bathtub forming surface corresponding to an internal shape of the bathtub and a flange extending from a circumference of the bathtub forming surface to the outside, on an external surface of an internal mold; and a third operation of forming a semi-rigid foam layer having a soft foam layer and an unfoaming painted layer formed sequentially between the external structure layer and the mold-release agent layer by being injected in a space between the external structure layer and the mold-release layer.

Further, there is provided in this invention a bathtub comprising an external structure layer comprising only an exterior shape of a bathtub; and a semi-rigid foam layer having a unfoaming painted layer, soft foam layer and unfoaming painted layer formed on the external structure layer in sequence.

In accordance with the method of preparing bathtub with cushion and the bathtub of the present invention, it has advantages in that it provides a bathtub with cushion function having a good contact feeling with regard to the inside layer of the bathtub when compared to the prior bathtubs, giving comfort due to its cushion, securing safety from impact due to its elastic material, having such an excellent warmth keeping ability that there is no need to refill water during bath, and being able to be utilized even as a bed or cradle after bath especially in case of being applied to bathtubs for infants, and further, it enables to manufacture a cushioned bathtub with a low cost due to a simplified manufacturing process and thereby reduction of unnecessary production loss and manufacturing costs. Furthermore, it has advantages in that it is light so that women whose physical ability is relatively inadequate can readily handle it.

DETAILED DESCRIPTION OF THE INVENTION

The invention is further described in detail with reference to the drawings.

The present invention is directed to a method of preparing bathtub, comprising a first step of forming an external structure layer comprising an exterior shape of a bathtub; a second step of forming a mold-release agent layer on an outside surface of an inner mold, having a flange part extended from a molded bathtub surface corresponding to an inner shape of the bathtub and a rim of the molded bathtub to the outside; and a third step of forming a semi-rigid foam layer having a unfoaming painted layer, soft foam layer and unfoaming painted layer in sequence between the external structure layer and the layer of release agent by filling them into the gap between the external structure layer and the layer of release agent.

It is noted that the first step can be carried out even after the shooting of a semi-rigid foam layer of the third step as will be described in detail hereafter, and those steps are not needed to be necessarily carried out in order and it is to be understood that each of the steps is to be carried out.

With these understandings, the invention is described with regard to each step.

The first operation is an operation which forms an external structure layer 4 having an external appearance of a bathtub. The external structure layer forms an external surface of a bathtub and acts as a structure of the bathtub. The external structure layer may be formed by using a rigid resin material typically used for preparing a rigid bathtub. In case of preparing a portable baby bathtub, a mold opening method and an injection mold by molding resin including polyethylene or polypropylene ABS resin added with a hardener may be used. More specifically, a rigid material should be used to maintain the shape of the bathtub. More preferably, general plastics such as PS, PE, PP, acryl, ABS, PVC and PET, which are soft enough to overcome falling shock or external shock to some degree, may be used. The external structure layer is prepared by vacuum-forming a plastic shaped like a sheet in a thickness of 2 mm to 5 mm with a typical vacuum forming machine. In case of a fixed type bathtub, RFP including unsaturated polyester resin and glass fiber is used to prepare a 4 mm-5 mm external structure layer or an acryl sheet in a thickness of 4 mm to 5 mm is vacuum-formed to prepare the external structure layer. Here, the external structure layer should form an external appearance of the bathtub and an unnecessarily-extended part thereof should be removed through a post processing.

The second operation is an operation which forms a mold-release layer on an external surface of an internal mold having the bath forming surface corresponding to the internal shape of the bathtub and a flange extended from a circumference of the bath forming surface.

Figure 1:
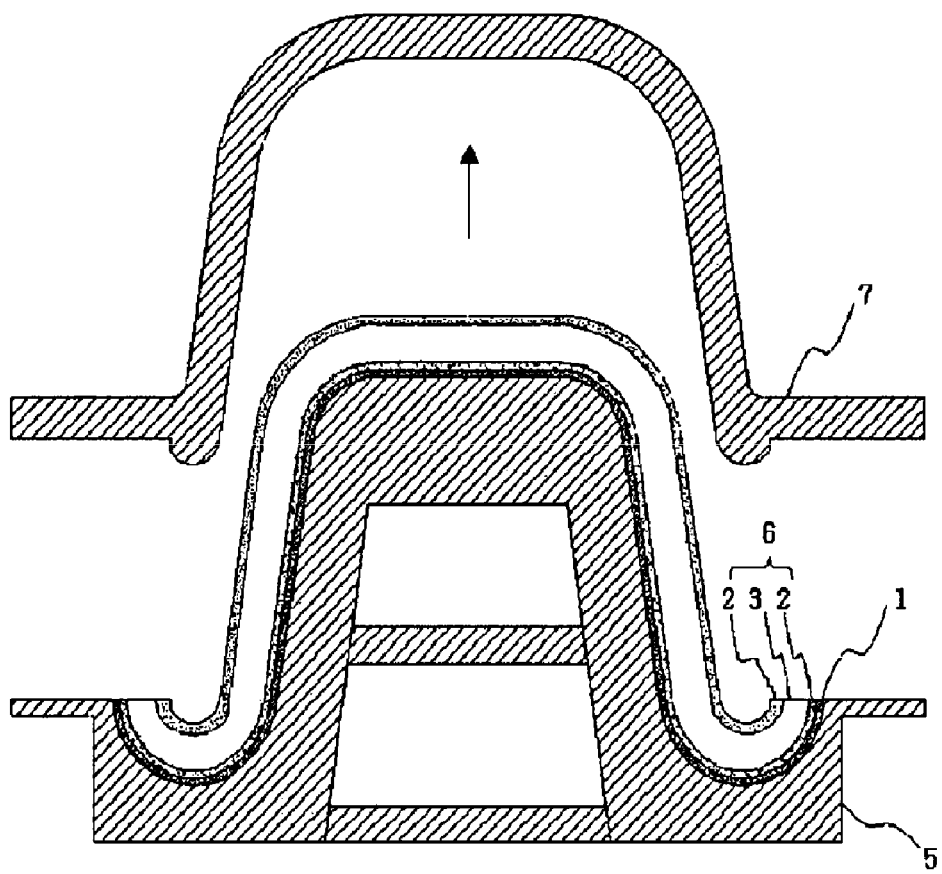
FIG. 1 is a scheme illustrating a partial process of one embodiment regarding a method of preparing bathtub with cushion of the present invention.

As shown in FIG. 1, the mold includes the bath forming surface and the flange extending from the circumference of the bath forming surface to the outside (left and rights sides in the drawing), which refers to a male bathtub mold 5 including FRP material or metal material used typically in the bathtub industry. As shown in FIG. 1, a rear surface of the male bathtub mold 5 is applied with a mold-release agent such as wax for mold-releasing treatment to form a mold-release agent layer 1.

On the mold-release layer 1 may be formed a cushion surface coating layer (not shown) which forms a surface of a cushion and has good gloss, elasticity and anti-scratch, wherever necessary. That is, the cushion surface coating layer may be formed on the mold-release agent layer formed from the foregoing process. More specifically, the cushion surface coating layer is formed by applying and drying a solvent type acrylpolyurethane coating agent, or a water-based or oil-based polyurethane coating layer. Preferably, the cushion material forming the cushion surface coating layer includes a soft resign which has at least 50% extension rate when fractured. The cushion surface coating layer may be applied to the flange to form an extension part of the semi-rigid foam layer or may be shorter than that. For example, the cushion surface coating layer may be formed to an front end of the flange to allow a curved surface to be the extension part.

According to the first exemplary embodiment of the present invention, the semi-rigid foam layer 6 which has an existing elastic protecting layer and the foam layer is formed at the third operation. Such a semi-rigid foam layer is typically called an integral skin foam (hereinafter, to be called "ISF").

According to the first exemplary embodiment of the present invention, the ISF layer may be prepared by using HA-7150 and RSA-76 of Korea Polytech Co., Ltd. The ISF layer includes a typical polyurethane semi-rigid foam and the forming density is about 150-400 kg/m$^3$, and its surface hardness is preferably Shore C=30-70 for cushion and costs. The ISF layer may be formed by mixing semi-rigid polyurethane foam material by a typical agitating method, i.e., with an agitator at 3,000 to 5,000 RPM or injecting the material to the mold after mixing the material with a low-temperature foaming machine or a high-temperature foaming machine.

The material which is used for forming the ISF layer includes a major material and a hardener which can be mixed at the rate of 100 wt % to 30-100 wt %.

The major material includes polyetherpolyol; polymerpolyol in which a monomer of acrylonitrile or styrene-acrylonitrile; a catalyst; a foaming agent; and a liquid mixture uniformly including a chain extender or surfactant as necessary.

Polyesterpolyol may include 2-3 OH functional groups and 40 wt % to 100 wt % with molecular weight of 3,000 to 10,000.

Polymerpolyol includes acrylonitrile or styrene-acrylonitrile monomers of 10 wt % to 45 wt % and hydroxyl value of 20 to 60 mg KOH/g with 0 wt % to 60 wt %.

The chain extender may include dihydric alcohol, e.g., ethylene glycol, diethylene glycol, dipropyleneglycol, diethanolamine or triethanolamine of 0 wt % to 15 wt %.

The surfactant may include, e.g., tertiary amine of 0.1 wt % to 5.0 wt %.

The foaming agent may include a chemical foaming agent which includes water or carbonyl acid in the range of 0 wt % to 1.0 wt %. A physical foaming agent may include CFC-11, HCFC-141b, pentane, methylene chloride or hydrofluorocarbon of 0.1 wt % to 40 wt %.

The hardener may include a liquid mixture, including NCO % of 20 wt % to 35 wt %, which is made by mixing isocyanate compound and alcohol and then reacting the mixture at 80° C. for at least two hours.

The isocyanate compound may include methylene diphenyl diisocyanate (MDI), toluene diisocyanate (TDI), or isocyanate mixed with MDI and TDI.

Alcohol may include 2-3 OH functional groups, and 2 wt %-15 wt % polyol having molecular weight of 200 to 6,000 or dihydric alcohol monomer or trihydric alcohol monomer of 0.1 wt %-10 wt %.

In a specific embodiment, the ISF layer may be prepared by using a main ingredient such as HA-7120B, HA-7150B or SR-300B of Korea Polytec Co. Ltd, and a hardening product such as HA-7120A, HA-7150A or RS-76A.

Further, for the formation of a colored ISF layer, for an instance, a colored pigment may be added and stirred in an amount of 0.2 to 5.0 wt % with regard to 100 wt % of the main material. For the colored pigments, there can be used any conventional products of oil type.

Figure 2:
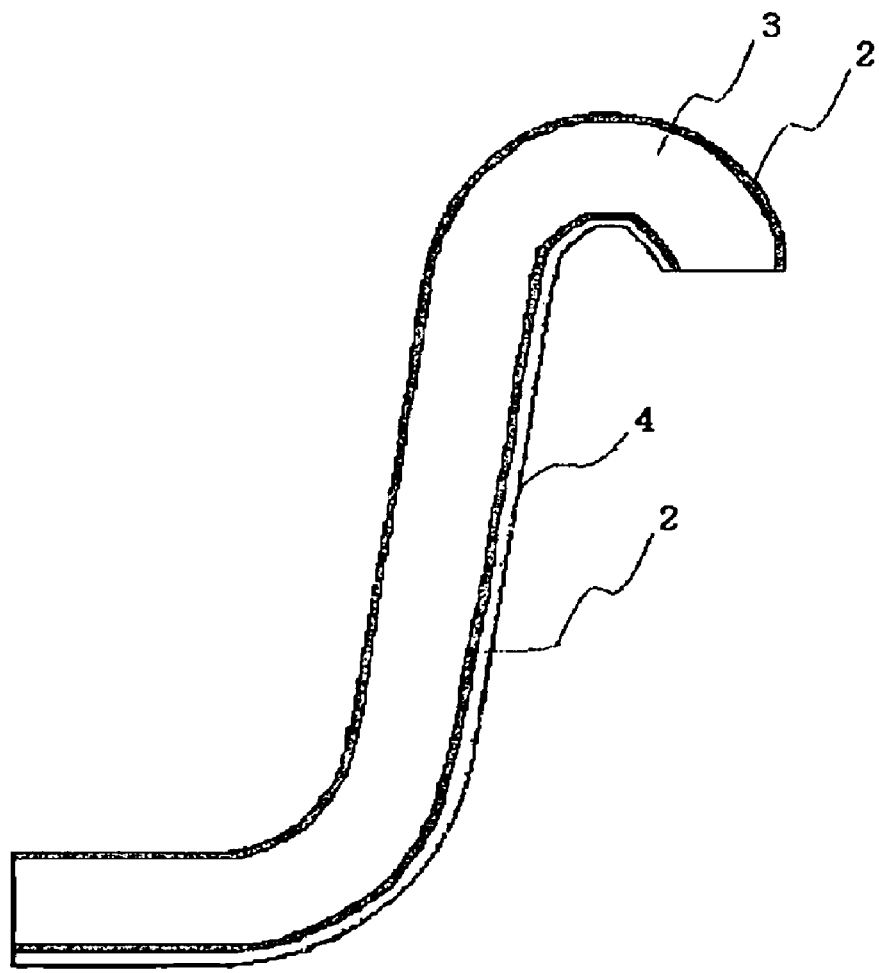
FIG. 2 is a structure view of one side cross section of a bathtub with cushion of the present invention.

Similarly to the method of connecting typical upper/lower molds and injecting foaming agent in the space thereof, the semi-rigid foam layer 6 may be formed by connecting the mold having the external structure layer 4 and the mold 5 having the mold-release layer and by injecting the foregoing materials in the space thereof, or by connecting the external structure layer 4 separated from the mold and the mold applied with the mold-release agent and by injecting the materials in the space thereof. Here, the temperature of the respective molds preferably maintains 30° C. to 60° C. for quality. As shown in FIG. 1, an external mold 7 which is mold-released is fitted into the internal mold applied with the mold-release agent and then the semi-rigid foam layer is formed by the foregoing materials. If the external mold is separated, the shape as in FIG. 2 may be obtained. The bathtub as shown in FIG. 2 may be prepared by connecting the external structure layer 4 with the semi-rigid foam layer formed as above.

The surface of the semi-rigid foam layer or the ISF layer contacting the internal surface of the mold has a thickness of 0.3 mm to 3 mm and includes the unfoaming painted layer 2 and the soft foam layer 3 with cushion as an internal layer.

This invention is clearly distinguished from the prior arts. In the previous methods of preparing bathtubs with cushion as described in Korea Patent No. 832051, an elastic protecting layer and a foam layer were prepared in a separate process. Thus, in the prior arts, since the elastic protecting layer (1-4 mm in thickness) has been formed through a repeat process of coating and drying a live rubber extract or silicon, urethane, acrylic resin in a thickness of 0.5 to 1.0 mm in 3 to 5 times, it required long time and generated bumpy surfaces and cracks due to several repeats of coating and drying processes, thereby causing failure (Most failures in the cushioned bathtubs were resulted from the formation of the elastic protecting layer). Furthermore, in order to form a separate layer of foaming material, the mold had to be slanted at an angle of 40 to 60° and thus it took approximately a total of 150 to 200 min to form both the elastic protecting layer and foaming material.

In contrast, the present invention enables to obtain a elastic protecting layer—a foam layer—a elastic protecting layer in a single process. Since the present invention only requires 15 to 20 min. for the formation of a elastic protecting layer—a foam layer—a elastic protecting layer and they are prepared by a one-time process, it remarkably prevents production deterioration due to the failure of surfaces and there is no need to control the slant angle of molds. Furthermore, polyurethane materials used to form such semi-rigid foam layers are relatively inexpensive when compared to the elastic protecting layer coating of fast cure. Also, in the prior arts, a painting layer has been formed between a transparent coating layer and elastic protecting layer in a separate process in order to add color to bathtubs but in the present invention, a pigment can be added when a semi-rigid foam layer is being formed, so that color can be added in a single process at the same time with the preparation of a elastic protecting layer—a foam layer—a elastic protecting layer (an unfoaming painted layer 2—a soft foam layer 3—unfoaming painted layer 2).

Also, the present invention provides a bathtub with cushion, which comprises an external structure layer comprising only an exterior shape of a bathtub; and a semi-rigid foam layer having a unfoaming painted layer, a soft foam layer and unfoaming painted layer formed on the external structure layer in sequence. Further, the bathtubs having cushion in accordance with the invention may optionally comprise a cushion surface coating layer formed on the semi-rigid foam layer, and this semi-rigid foam layer may optionally have colors. The cushioned bathtubs in accordance with the invention have advantages in that they have good contact feelings with regard to the inside layer of the bathtubs, give comforts due to their cushion, secure safety from impact due to their elastic materials, and keep remarkably warm by forming the unfoaming painted layers (elastic protecting layer) on the both sides of the soft foam layer (layer of foaming material) (i.e., three layers of the unfoaming painted layer-soft foam layer-unfoaming painted layer) when compared to the prior cushioned bathtubs (two layers consisting of the elastic protecting layer-layer of foaming material).

A specific embodiment of the present invention is illustrated in FIG. 2. The bathtubs having the structure illustrated can be manufactured by the methods described in the above and it may further prepared by other methods for preparation. The bathtubs can be all kinds of conventional bathtubs and there can be included fixed bathtubs, portable bathtubs, etc, and preferably, bathtubs for infants can be mentioned in that they increase the use and effect of the bathtubs.

It is to be understood that the invention described in the above is not limited to the aforementioned embodiments and accompanying drawings, and various modifications and alterations by those having ordinary skill in the pertinent art without departing from the spirit and scope of the present invention as described in the following claims are still within the scope of the invention.

In accordance with the method of preparing bathtub with cushion and the bathtub of the present invention, it has advantages in that it provides a bathtub with cushion function having a good contact feeling with regard to the inside layer of the bathtub compared to the prior bathtubs, giving comfort due to its cushion, securing safety from impact due to its elastic material, having such an excellent warmth keeping ability that there is no need to refill water during bath, and being able to be utilized even as a bed or cradle after bath especially in case of being applied to bathtubs for infants, and further, it enables to manufacture a cushioned bathtub with a low cost due to a simplified manufacturing process and thereby reduction of unnecessary production loss and manufacturing costs. Furthermore, it has advantages in that it is light so that women whose physical ability is relatively inadequate can readily handle it.

What is claimed is:

1. A method of manufacturing a bathtub, the method comprising:
   a first operation of forming an external structure layer forming an external appearance of the bathtub;
   a second operation of forming a mold-release agent layer having a bathtub forming surface corresponding to an internal shape of the bathtub and a flange extending from a circumference of the bathtub forming surface to the outside, on an external surface of an internal mold; and
   a third operation of forming a semi-rigid foam layer having a first unfoaming painted layer, a soft foam layer, and a second unfoaming painted layer in sequence such that the soft foam layer is sandwiched between the first unfoaming painted layer and the second unfoaming painted layer, wherein the semi-rigid foam layer is formed between the external structure layer and the mold-release agent layer by being injected in a space between the external structure layer and the mold-release agent layer.

2. A bathtub comprising:
an external structure layer forming an exterior shape of the bathtub; and
a semi-rigid foam layer having a first unfoaming painted layer, a soft foam layer and a second unfoaming painted layer in sequence such that the soft foam layer is sandwiched between the first unfoaming painted layer and the second unfoamigq painted layer.

3. The method of claim 1, wherein the semi-rigid foam layer is formed in a single process.

4. The method of claim 1, wherein the injection of the semi-rigid foam layer in the space between the external structure layer and the mold-release agent layer is a single injection, not requiring a repetitive process of coating and drying processes.

5. The method of claim 1, further comprising:
adding a pigment to at least the first unfoaming painted layer or the second unfoaming painted layer when forming the semi-rigid foam layer.

6. The method of claim 5, wherein a color is painted in a single process at the same time with the formation of the semi-rigid foam layer.

* * * * *